United States Patent [19]

Duncombe et al.

[11] Patent Number: 4,576,781
[45] Date of Patent: Mar. 18, 1986

[54] TEMPERATURE THRESHOLD DETECTORS

[75] Inventors: Edward Duncombe, Altrincham; John P. Winstanley, Lymm, both of England

[73] Assignee: United Kingdom Atomic Energy Authority, London, England

[21] Appl. No.: 394,879

[22] Filed: Jul. 2, 1982

[30] Foreign Application Priority Data

Jul. 28, 1981 [GB] United Kingdom ................. 8123184

[51] Int. Cl.⁴ .................... G21C 17/00; G01K 7/38
[52] U.S. Cl. .................... 376/247; 374/176; 374/184
[58] Field of Search ............... 376/245, 254, 255, 336, 376/247; 374/176, 184; 340/870.17; 324/203

[56] References Cited

U.S. PATENT DOCUMENTS

| 2,460,773 | 2/1949 | Stimson | 374/184 |
| 2,615,973 | 10/1952 | Heath | 324/203 |
| 3,087,886 | 4/1963 | Robinson | 374/184 |
| 3,564,401 | 2/1971 | Coon | 324/203 |
| 3,950,993 | 4/1976 | Sidor | 374/184 |
| 3,976,540 | 8/1976 | Sowa | 376/336 |
| 4,304,632 | 12/1981 | Bhate et al. | 376/336 |
| 4,371,272 | 2/1983 | Iwasaki | 374/184 |
| 4,405,558 | 9/1983 | Mangus et al. | 376/336 |

FOREIGN PATENT DOCUMENTS

| 2062901 | 6/1971 | Fed. Rep. of Germany . |
| 2117137 | 10/1972 | Fed. Rep. of Germany . |
| 2658203 | 7/1978 | Fed. Rep. of Germany . |
| 1271260 | 4/1972 | United Kingdom . |
| 1369658 | 10/1974 | United Kingdom . |

Primary Examiner—Salvatore Cangialosi
Attorney, Agent, or Firm—William R. Hinds

[57] ABSTRACT

A threshold temperature is detected by providing a sensor (12) comprising a magnet (13) inside a ferromagnetic shield (14) which has a lower Curie point than that of the magnet. Below threshold the sensor is magnetically characterless. Above threshold the sensor displays a magnetic character which is detected at a solid-state magnetometer (16). In one application the sensor is located in a breeder fuel sub-assembly (20) at the breeder/fuel region (22) of a fast-fission nuclear reactor and the magnetometer is located in a fuel sub-assembly (21). In another application the sensor is located inside a sealed containment vessel and the magnetometer is located outside the vessel.

10 Claims, 2 Drawing Figures

TEMPERATURE THRESHOLD DETECTORS

BACKGROUND OF THE INVENTION

This invention relates to temperature threshold detectors.

The monitoring of the temperatures in operating plant is commonly performed by having thermocouples in the plant which are wired to instruments in a control room or to processors. Generally, this is a very satisfactory system. However, where there are a large number of thermocouples it becomes necessary to provide structural components to support cables connecting with the thermocouples. Even this can be acceptable in a static environment but where movable elements have also to be provided cable supporting components can either create problems of operation or restrict design freedom. A further problem may also arise with wired thermocouples, namely that of providing infallible sealing glands where the wires pass through a sealed containment vessel.

Wired thermocouples for temperature threshold detection can create problems as above stated in locations, such as nuclear reactors, where access is not readily obtainable and in sealed containers for heat generating materials, such as in flasks for irradiated nuclear fuel.

The present invention seeks to solve the above stated problems by providing a simple form of unwired transmitting sensory, and a detector receiver. Whilst this does not wholly eliminate the use of wires (which are required at the detector) it allows wiring to be either located in a more acceptable position or for sealing glands to be avoided.

SUMMARY OF THE INVENTION

The temperature threshold detector system according to the present invention comprises a threshold temperature sensor and a detector displaced therefrom for detecting the output of said sensor characterised in that the sensor comprises a magnet inside a ferromagnetic shield having a lower Curie point than that of the magnet; and the detector is responsive to a change in the field of the magnet as arises when the Curie point of the shield is exceeded.

At temperatures below the Curie point of the shield the sensor is magnetically characterless as far as the detector is concerned. As the Curie point is reached the sensor takes on a magnetic character which is detectable at the detector. Thus there can be provided in a hostile or dangerous environment a robust transmitting sensor which can transmit, without the use of wires, the existence of a temperature threshold condition to a detector receiver located near to the hostile or dangerous environment. The detector, which would normally be wired, could be outside this environment (eg outside an austenitic stainless steel vessel in which the sensor is located together with a dangerous substance) or the detector could be in the hostile environment but displaced from the sensor by a degree allowing freedom in other design elements in the environment or displaced to a position at which wired connections are acceptable.

The detector receiver is preferably a fluxgate magnetometer (see Primdahl F 1979 J Phys Sci Instrum Vol 12), an instrument which can be designed for operation at high temperatures and, like the sensor, has no moving parts.

DESCRIPTION OF THE DRAWING

The invention, in one form, will now be described with reference to the accompanying drawings in which.

DESCRIPTION OF THE PREFERRED EMBODIMENTS

Figure 2:
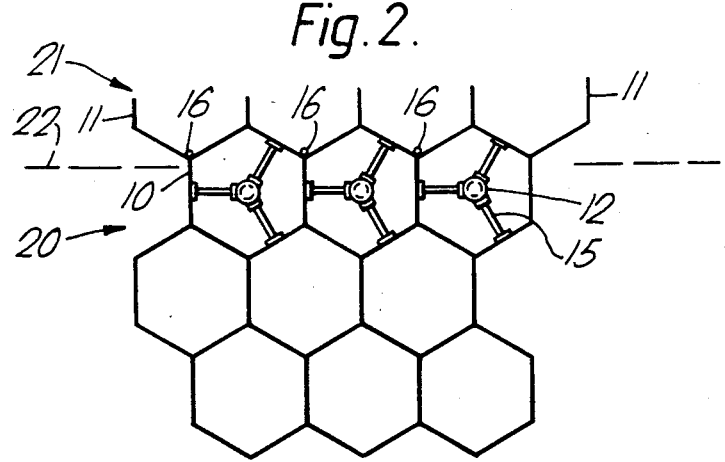
FIG. 2 shows diagrammatically in plan a group of vertically orientated sleeves for sodium cooled fast-fission nuclear fuel sub-assemblies, some of which are in the fissile core of the reactor and some are in the breeder region.

In FIG. 2 there is shown a fissile part 21 of the core of "fast" nuclear reactor core and a breeder part 20 of that reactor. The dash line 22 indicates the boundary between the fissile and breeder parts of the core.

The part 20 comprises nested hexagonal sleeves 10 carrying breeder fuel (not shown) and the part 21 comprises nested hexagonal sleeves 11 containing fissile fuel (not shown). Reference is made, for example, to UK patent application GB No. 2,017,385 for detail construction of reactor and sleeves.

Figure 1:
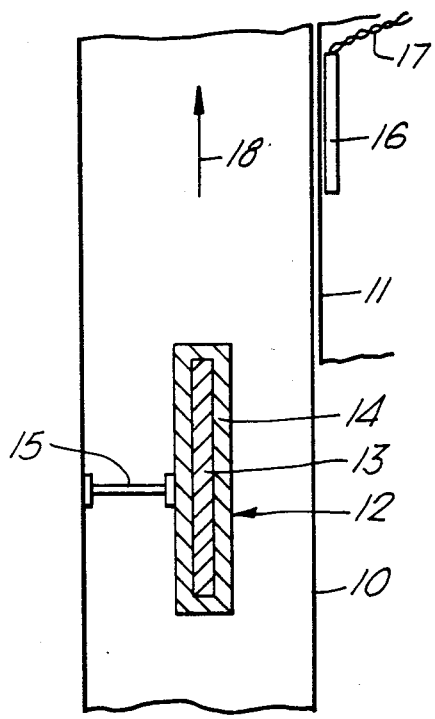
FIG. 1 shows diagrammatically in elevation the upper end of a single vertically orientated sleeve for a sodium cooled nuclear fuel assembly in the breeder region of a fast reactor.

A typical breeder sleeve 10 is shown in FIG. 1. This includes a transmitting sensor 12 comprising a permanent magnet 13 enclosed in a ferromagnetic shield 14 having a lower Curie point than that of the magnet. The unit is supported by a spider 15 in the coolant outlet flow region of the sleeve. Alongside the sleeve 10 a part of a fissile fuel sleeve 11 is shown on which is located a receiver detector 16 with connecting wires 17. The distance of displacement between sensor 12 and detector 16 is about twelve centimeters. Flow of sodium upwardly in the sleeve 10 is indicated by the arrow 18.

Referring again to FIG. 2 it is seen that the detectors 16 each come under the influence of two respective adjacent transmitting sensors 12. Should the temperature of sodium flowing in any sleeve 10 with a sensor 12 reach the Curie point of the shield 14 of the sensor 12 in that sleeve then a magnetic field is exposed which sets up a voltage proportional to the magnetic field in two adjacent receiver detectors 16.

For the arrangement shown in FIG. 2 a checking (truth) table can be drawn up as shown below in which:

Col I shows the sodium temperature ("A" for "low" and "B" for "high") in the left hand sleeve 10;

Col II shows similary for the centre sleeve 10; and

Cols III, IV, and V shows the outputs from the left hand, centre, and right hand detectors 16 respectively ('0' for no output and "1" for one unit of output voltage and "2" for two units of output voltage).

| I | II | III | IV | V |
|---|----|-----|----|----|
| A | A | 0 | 0 | 0 |
| A | B | 0 | 1 | 1 |
| B | A | 1 | 1 | 0 |
| B | B | 1 | 2 | 1 |

Thus, from the top line of the table positive evidence is provided that all is well in both left hand and centre sleeves 10; the second line confirms that the centre sleeve 10 is overheating; the third line confirms that the left hand sleeve 10 is overheating and the last line shows that both sleeves 11 are overheating.

This is merely illustrative. In practice, the table can be extended to deal with all sleeves 10 equipped with sensors 12. The output from the detectors 16 can be scanned at regular time intervals and their outputs fed into a computer/processor for analysis and display.

With the use of the invention as above described it is possible to avoid any thermocouple cable supporting structural elements above those sleeves 10 which are equipped with sensors 12.

The invention possesses the following useful properties:
a. both detectors (16) and transmitting sensors (12) can be made robust in construction ahd have no moving parts;
b. both detectors and sensors are cheap in material and manufacturing costs;
c. the sensors are not sensitive to very rapid temperature transients therefore the risk of spurious alarms is reduced;
d. the sensors tend to integrate any temperature gradient in the outlet sodium flow (18);
e. there is a certain amount of redundancy for the detection of a high temperature.

The detectors 16 are fluxgate magnetometers having for example a core material of iron wire in a core former of stainless steel. The windings of the detectors are 1 mm insulated copper conductor (MICC) stainless steel sheathed. This form of construction allows operation at the working temperature of fast-fission reactor mainly up to 600° C.

The sensors 12 have "Hycomax III" permanent magnets 13 of elongate form and, for instance, shields 14 of "KANTHAL" material (nominal Curie point of 570° C.), but other materials can be selected if the critical temperature to be detected is other than 570° C. Ideally the magnetometer 16 should lie parallel to the lines of force from the magnet 13 but operationally this may not always be possible.

Whilst the invention has been generally described in the context of fast reactor use it is forseen that the sensors 12 could be used inside sealed vessels (such as vessels carrying irradiated fuel or vessels carrying heat emitting powdered or liquid materials) with detectors 16 on the outside of the vessels.

In a modified form the shield 14 is made of two differing materials. Typically the upper half differs from the lower half. In this way a signal of reduced strength may be received when a "low" temperature is exceeded and a full strength signal received when a "high" temperature is exceeded. This construction may be used to provide an early warning system of a temperature rise or may be used to identify the upper and lower limits of a temperature band.

As an alternative to locating the receiver detector 16 in the fuel sleeve 11 it could be mounted in one of the outermost core thermocouple positions which are provided as a part of the basic construction of fast reactors.

We claim:

1. A temperature threshold detector system comprising a threshold temperature sensor nd an independently locatable and physically separate detector displaced therefrom for detecting the output of said sensor wherein the sensor comprises a magnet inside a ferromagnetic shield having a lower Curie point than that of the magnet, the detector being responsive to a change in the field of the magnet as arises when the Curie point of the shield is exceeded.

2. A system as claimed in claim 1 wherein the detector is a fluxgate magnetometer.

3. A system as claimed in claim 1 wherein there is an array of sensors and each detector is responsive to the change in magnetic field of a respective adjacent pair of sensors.

4. A system as claimed in claim 3 wherein the sensors are disposed in respective breeder fuel sub-assemblies at the boundary region of a fast fission nuclear reactor and the detectors are located in fissile fuel sub-assemblies also at said boundary region.

5. A system as claimed in claim 1 wherein the sensor is located inside a containment vessel and the detector is located outside said vessel.

6. A temperature threshold detector system comprising a threshold temperature sensor for transmitting a wireless output indicative of the existence of a temperature threshold condition, an independently locatable and physically separate detector displaced therefrom and unconnected therewith for detecting the wireless output of said sensor, and means for connecting said detector with a monitoring station, said sensor comprising a permanent magnet having a first Curie point inside a ferromagnetic shield having a second Curie point lower than the first Curie point, said detector being responsive to a change in the field of the magnet as arises when the Curie point of the shield is exceeded.

7. A system as claimed in claim 6 wherein the detector is a flux gate magnetometer.

8. A system as claimed in claim 6 wherein there is an array of sensors and each detector is responsive to the change in magnetic field of a respective adjacent pair of sensors.

9. A system as claimed in claim 8 wherein the sensors are disposed in respective breeder fuel sub-assemblies at the boundary region of a fast fission nuclear reactor and the detectors are located in fissile fuel sub-assemblies also at said boundary region.

10. A system as claimed in claim 6 wherein the sensor is located inside a containment vessel and the detector is located outside said vessel.

* * * * *